United States Patent [19]
Toyoda

[11] Patent Number: 5,591,413
[45] Date of Patent: Jan. 7, 1997

[54] METAL CARRIER FOR A CATALYTIC CONVERTER

[75] Inventor: Tetsuro Toyoda, Akishima, Japan

[73] Assignee: Showa Aircraft Industry Co., Ltd., Tokyo, Japan

[21] Appl. No.: 460,881

[22] Filed: Jun. 5, 1995

[30] Foreign Application Priority Data

Jun. 13, 1994 [JP] Japan .................................. 6-130154

[51] Int. Cl.$^6$ .................................................. B01D 53/34
[52] U.S. Cl. .......................... 422/180; 422/171; 422/177; 422/211; 422/222; 502/439; 502/527
[58] Field of Search ...................................... 422/171–176, 422/180, 179, 177, 174, 199, 211, 221, 222; 502/439, 527; 60/299; 428/593, 116, 117

[56] References Cited

U.S. PATENT DOCUMENTS

| | | |
|---|---|---|
| 4,118,199 | 10/1978 | Volker et al. ........................... 422/180 |
| 4,300,956 | 11/1981 | Rosenberger et al. .................. 422/180 |
| 4,521,947 | 6/1985 | Nonnenmann et al. ................. 422/177 |
| 5,084,361 | 1/1992 | Toyoda et al. .......................... 428/593 |
| 5,316,997 | 5/1994 | Toyoda et al. .......................... 502/527 |
| 5,328,774 | 7/1994 | Maus et al. ............................. 428/593 |
| 5,336,472 | 8/1994 | Toyoda et al. .......................... 422/177 |

FOREIGN PATENT DOCUMENTS 4024942  2/1992  Germany.

Primary Examiner—Robert J. Warden
Assistant Examiner—Hien Tran
Attorney, Agent, or Firm—Oblon, Spivak, McClelland, Maier & Neustadt, P.C.

[57] ABSTRACT

A first honeycomb structure not bonded with brazing filler metal and having a catalyst-carrying layer, and two second honeycomb structures bonded together with brazing filler metal and without applying a catalyst-carrying layer arranged before and after the first honeycomb structure are aligned coaxially inside a cylindrical casing. The first honeycomb structure preferably has a greater concentration of air passages than the second honeycomb structures and moreover, is spaced a fixed distance from each of the second honeycomb structures.

5 Claims, 2 Drawing Sheets

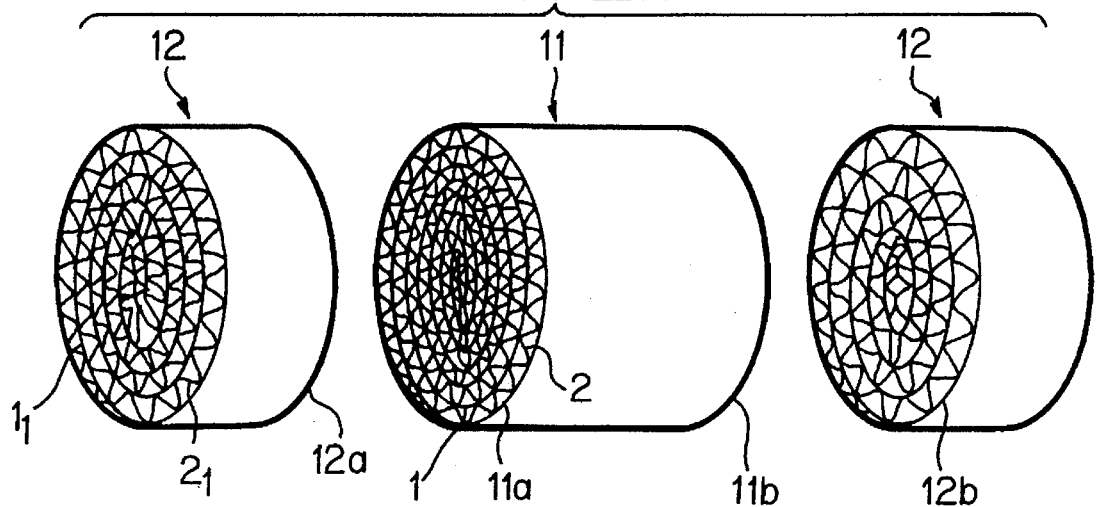
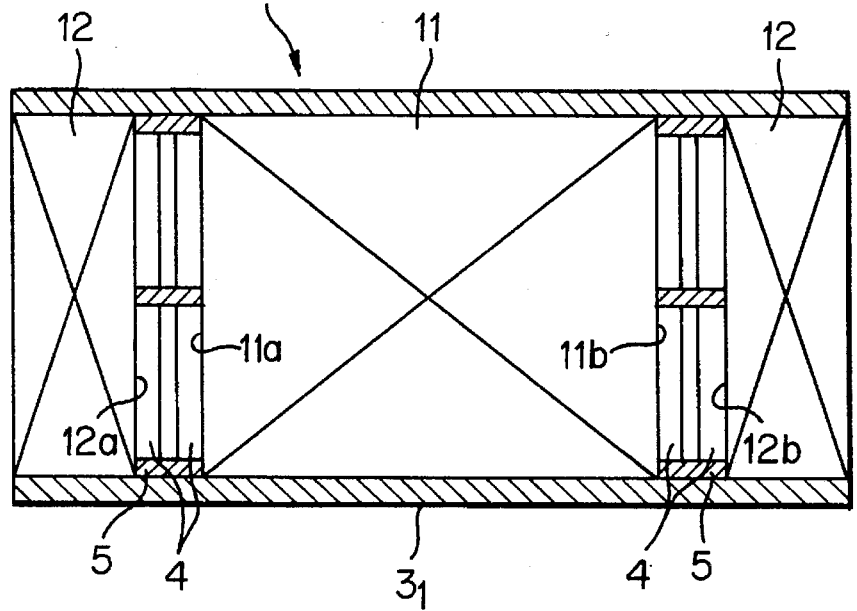

METAL CARRIER FOR A CATALYTIC CONVERTER

BACKGROUND OF THE INVENTION

1. Field of the Invention

The present invention relates to a metal carrier for a catalytic converter that is formed as a honeycomb structure for use in a device for purifying exhaust gas in an internal combustion engine, and particularly to a metal carrier for a catalytic converter designed to prevent breaks or cracks due to thermal strain in a rolled honeycomb structure.

2. Description of the Related Art

As shown in FIG. 1, metal carriers for catalytic converters used in exhaust gas purifying systems of the prior art are constructed by interposing brazing filler metal between thin metal flat sheet 31 and thin metal corrugated sheet 32, stacking the flat sheet 31 and corrugated sheet 32, rolling the sheets into a rolled form from one edge to form a honeycomb structure 34, and using a high-vacuum furnace, melting the brazing filler metal to bond the contacting portions of the sheet material. A nickel-based brazing filler metal is used as the brazing filler metal, and ferritic stainless steel is used for the flat sheet and corrugated sheet. A honeycomb structure 34 formed in this way and housed within a metal casing 33 is known in the art as a metal carrier for a catalytic converter 30 (for example, Japanese Patent Laid-open 4373/81).

A catalyst-carrying layer composed of, for example, alumina, is formed on the surface of the honeycomb passages of the honeycomb structure, and a precious metal catalyst is carried on this catalyst-carrying layer which performs the function of exhaust gas-purifying catalysis. When installed in the path of exhaust from an internal combustion engine, such a construction purges HC, CO, and $NO_x$ contained within the exhaust gas. Out of the necessity to ensure a maximum of honeycomb passage surface area in a limited cubic volume, the flat and corrugated sheet are of the minimum thickness capable of maintaining strength.

In the metal carrier for a catalytic converter based on the above-described honeycomb structure of the prior art, the speed of flow of exhaust gas through the honeycomb structure is faster along the inner layers than along the outer layers, and accordingly, heat generation due to catalytic reaction and contact with hot exhaust gas, as well as heat radiation from the casing, result in a temperature distribution such that heat increases toward the inner layers and decreases toward the outer layers. Due to this heat distribution, expansion and contraction of the hotter inner layers of the honeycomb structure are greater than the expansion and contraction of the cooler outer layers of the honeycomb structure, and this variance results in thermal strain between the inner layers and outer layers. This thermal strain is repeated each time the honeycomb structure expands and contracts, and because all of the flat sheet 31 and corrugated sheet 32 is integrated as a single brazed structure by means of brazing filler metal as shown in FIG. 1, this strain cannot be released, resulting in the problem that over a long period of use, breaks are caused at the bonding points between the flat sheet 31 and corrugated sheet 32.

SUMMARY OF THE INVENTION

The object of the present invention is to provide a metal carrier for a catalytic converter in which breaks due to thermal strain do not occur, and which is formed from a rolled honeycomb structure having a high concentration of air passages.

The metal carrier for the catalytic converter of the present invention comprises:

- a first honeycomb structure in which flat sheet material composed of thin flat metal sheet in strip form and corrugated sheet material composed of thin metal sheet folded continuously to form a corrugated surface in strip form are stacked in mutual contact and rolled into a spiral form without bonding to produce numerous air passages in a reticulate pattern, the surface of these air passages having a catalyst-carrying layer;
- a cylindrical casing arranged coaxially with and covering the first honeycomb structure; and
- two second honeycomb structures in which corrugated sheet material and flat sheet material are stacked in mutual contact, rolled into a spiral form to produce numerous air passages in a reticulate pattern, and the contacting portions bonded by brazing filler metal, one second honeycomb structure contacting each end of the first honeycomb structure in the axial direction of the first honeycomb structure, and bonded to the casing within the casing.

It is preferable that the metal carrier for a catalytic converter of the foregoing description include fixed gaps in the axial direction between the first honeycomb structure and the second honeycomb structures, and that the concentration of the air passages in the first honeycomb structure be greater than the concentration of the air passages in the second honeycomb structures.

In the case of the second honeycomb structures, which have a smaller concentration of air passages than the first honeycomb structure, a catalyst carrying layer can be applied on the surface of air passages of the structure.

It is preferable that the catalysts applied on the surface of the air passages in the first and second honeycomb structure include at least two from among a nitrogen oxides reduction catalyst, an oxidation catalyst and a reduction catalyst.

Because the first honeycomb structure is not bonded by means of brazing filler metal, metal sheet material can be used which has been provided with a catalyst-carrying layer in advance, and a greater concentration of air passages can be provided, thereby not only enabling an increase in catalytic efficiency, but, because no thermal strain occurs between the flat sheet and corrugated sheet, also increasing the durability.

The second honeycomb structures that are bonded using a brazing filler metal are arranged before and after the first honeycomb structure and act as stoppers for the first honeycomb structure. Because the second honeycomb structures do not carry a catalyst, there is no heat generation due to catalytic reaction, and accordingly, thermal strain arising in the bonded structure is eased. In addition, by reducing the concentration of air passages, air resistance is decreased, and the stream line flow effect of gas against the first honeycomb structure can be added.

In addition, by providing fixed gaps between the first honeycomb structure and the second honeycomb structures, turbulence is stimulated and catalytic efficiency in the first honeycomb structure is improved.

In the case of a smaller concentration of air passages in the second honeycomb structure with catalyst, less heat is generated by catalytic reaction compared with a greater concentration of air passages. Accordingly the effect due to heat strain is reduced.

The above and other objects, features, and advantages of the present invention will become apparent from the fol-

BRIEF DESCRIPTION OF THE DRAWINGS

FIG. 3 shows a schematic vertical section of another embodiment of the metal carrier for a catalytic converter of the present invention.

DETAILED DESCRIPTION OF THE PREFERRED EMBODIMENTS

Figure 1:
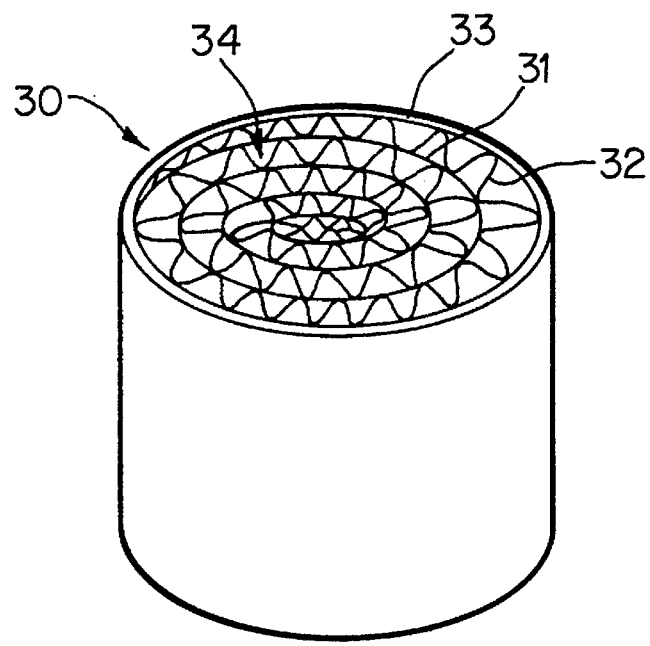
FIG. 1 is a schematic perspective view of a metal carrier for a catalytic converter according to the prior art.
Figure 2A:
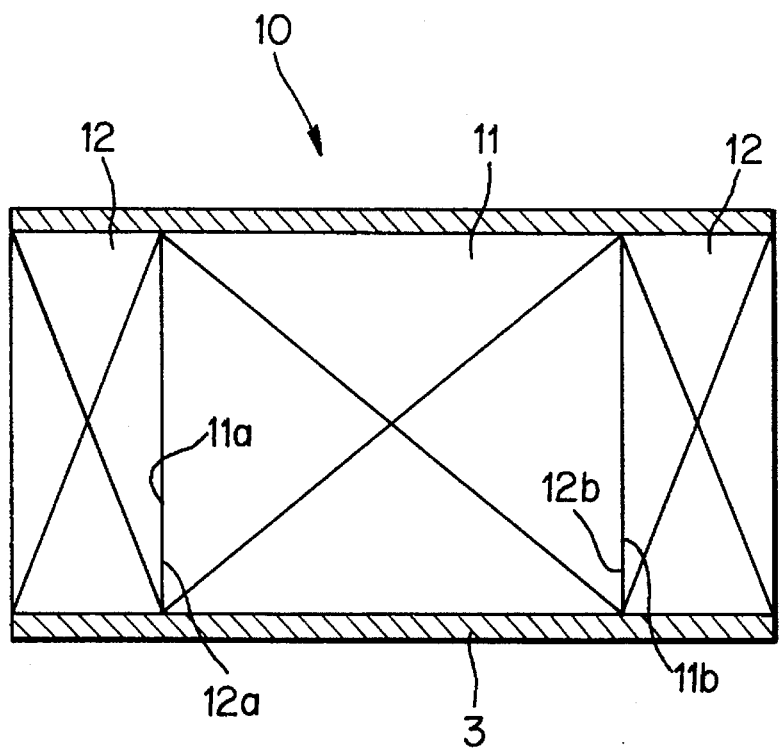
FIG. 2 shows views of a metal carrier for a catalytic converter of the present invention, FIG. 2A being a schematic vertical section, and FIG. 2B being a schematic exploded perspective view of a portion of the carrier of FIG. 2A with the casing removed.

Next, an embodiment of the present invention will be explained with reference to the figures. FIG. 2 shows views of the metal carrier for a catalytic converter according to the present invention, FIG. 2A being a schematic vertical section, and FIG. 2B being an exploded perspective view of a portion of FIG. 2A without the casing.

In FIG. 2A, a metal carrier 10 is formed by housing a first honeycomb structure 11 and two second honeycomb structures 12 arranged coaxially with the first honeycomb structure and in contact with each of both end portions 11a, 11b of the first honeycomb structure 11 within a casing 3. As shown in FIG. 2B, the first honeycomb structure 11 is formed by stacking together flat sheet material 1 formed from thin flat metal sheet in strip form and corrugated sheet material 2 formed from thin metal sheet folded continuously to form a corrugated uneven surface in strip form and rolling into a roll without using brazing filler metal. If flat sheet material and corrugated sheet material are used that have been formed from metal sheet to which has been applied a catalyst-carrying layer in advance, and if the honeycomb structure is formed without the use of brazing filler material, a first honeycomb structure 11 having finer air passages can be formed. Alternatively, the honeycomb structure may be formed by rolling flat sheet material and corrugated sheet material that have been formed from metal sheet that has not been provided with a catalyst-carrying layer, and the catalyst-carrying layer can be applied afterwards.

The second honeycomb structures 12 are formed by stacking flat sheet material $1_1$ and corrugated sheet material $2_1$ with brazing filler metal interposed and rolling together into a roll form, without applying a catalyst-carrying layer.

The corrugations of corrugated sheet material $2_1$ have greater size and pitch than the corrugations of corrugated sheet material 2. Accordingly, the concentration of air passages in the first honeycomb structure 11 is greater than the concentration of air passages in the second honeycomb structures 12.

Usually, the concentration of the airpassages in the first honeycomb structure 11 is 400–600 cells per sq. inch and in the second honeycomb structure 12 is 100–300 cells per sq. inch.

The casing 3 is a cylinder that houses the first honeycomb structure 11 and two second honeycomb structures 12, one arranged in contact with each end surface 11a, 11b in a coaxial direction with the first honeycomb structure, and although brazing filler metal is not inserted into the space between the first honeycomb structure and the casing when installing the first honeycomb structure 11 inside the casing 3, brazing filler metal is inserted into the space between the second honeycomb structures 12 and the casing 3 when installing the second honeycomb structures 12. In this way, the assembled casing and honeycomb structure assembly can be bonded together using a normal brazing method to obtain a metal carrier 10.

Accordingly, the first honeycomb structure 11 is not bonded to the casing 3, but because the second honeycomb structures 12 are bonded to the casing 3, the second honeycomb structures 12 can function as stoppers against movement in the axial direction of the first honeycomb structure 11.

Fixed gaps must be provided between the two end portions 11a, 11b of the first honeycomb structure 11 and the two end portions 12a, 12b of the second honeycomb structures 12, and by means of these gaps, a degree of freedom is provided for expansion in the axial direction of the first honeycomb structure 11, and stress due to thermal strain is eased.

As described hereinabove, because the first honeycomb structure 11 uses sheet material that has been pretreated with a catalyst-carrying layer and does not use brazing filler metal, a greater concentration of air passages can be achieved than when using brazing filler metal, thereby resulting in an improvement of catalytic efficiency and, because thermal strain due to heat generated by catalytic reaction and exhaust gas heat can be eased, an improvement in durability. The second honeycomb structures 12 are bonded by brazing filler metal, but because these honeycomb structures are made with a smaller concentration of air passages, resistance to the passage of exhaust gas is reduced, and moreover, a stream line flow effect is added, thereby improving catalytic efficiency in the first honeycomb structure. In addition, because no catalyst-carrying layer is applied, no heat is generated by catalytic reaction, and durability can therefore be improved due to the reduction of thermal strain.

FIG. 3 is a schematic vertical section of another embodiment of the present invention. In the metal carrier 20 of FIG. 3, a first honeycomb structure 11 and two second honeycomb structures 12 are arranged separated by gaps 4 in a casing $3_1$. The casing $3_1$ is not bonded to the first honeycomb structure 11 but is bonded to the second honeycomb structures 12. Spacers 5 are provided between the end portions 11a, 11b of the first honeycomb structure 11 and the end portions 12a, 12b of the second honeycomb structures 12 so that the second honeycomb structures 12 may function as stoppers against the first honeycomb structure 11. These spacers are ideally in the form of a grid, spiral, or similar shape that presents little resistance to flow and can prevent displacement of the first honeycomb structure 11 in the axial direction. Fixed gaps must be provided between the spacers 5 and the end portions 11a, 11b of the first honeycomb structure 11 to provide a degree of freedom for heat expansion of the first honeycomb structure 11 in the axial direction.

In above detailed description of the preferred embodiment, the catalytic carrying layer is not applied on the surface of the air passages in the second honeycomb structures 12, but it can be applied also in the second honeycomb structures 12. In this case, the effect due to heat strain is reduced and accordingly the durability will not be reduced because the second honeycomb structures 12 have a smaller concentration of air passages and less heat is generated by catalytic reaction than in the first honeycomb structure 11 which has a greater concentration of air passages.

At least two catalysts from among a nitrogen oxides reduction catalyst, an oxidation catalyst and a reduction catalyst are included in the layer on the surface of the airpassages in each first and second honeycomb structures 11, 12.

In the metal carrier for a catalytic converter of the present invention as described hereinabove, the first honeycomb structure employs a sheet material to which a catalyst carrier has been applied and does not employ brazing filler metal in forming the rolled honeycomb structure, thereby providing the effects of improved catalytic efficiency due to the increased concentration of air passages, and improved durability without bonding the sheet materials, which allows a reduction of thermal strain between sheet materials.

Because the second honeycomb structures, which are bonded together as integrated units by brazing filler metal, are bonded to the casing and function as stoppers at both ends of the first honeycomb structure, there is the further effect that the first honeycomb structure is maintained within the casing without being subjected to thermal stress, and in addition, because there is a stream line flow effect and a decreased resistance to flow brought about by reducing the concentration of air passages in the second honeycomb structures, the catalytic efficiency in the first honeycomb structure is improved. Because the second honeycomb structures are not provided with a catalyst-carrying layer, no heat is generated by catalytic reaction and thermal strain can be reduced, thereby providing the added effect of improved durability.

In the case of the second honeycomb structures with catalyst which have a smaller concentration of air passages than the first honeycomb structure, there is a further effect that less reduction of durability is obtained because less heat is generated by catalytic reaction and thermal strain can easily be reduced.

It is to be understood, however, that although the characteristics and advantages of the present invention have been set forth in the foregoing description, the disclosure is illustrative only, and changes may be made n the arrangement of the parts within the scope of the appended claims.

What is claimed is:

1. A metal carrier for a catalytic converter comprising:

a first honeycomb structure in which flat sheet material composed of thin flat metal sheet in strip form and corrugated sheet material composed of thin metal sheet folded continuously into a corrugated surface in strip form are stacked in mutual contact and rolled about an axis into a spiral form without bonding to produce numerous air passages in a reticulate pattern, the surface of the air passages having a catalyst-carrying layer including at least one catalyst, said first honeycomb structure including axially spaced ends;

a cylindrical casing arranged coaxially with the first honeycomb structure and enclosing the first honeycomb structure without being bonded thereto;

two second honeycomb structures each of which comprising flat sheet material composed of thin flat metal sheet in strip form and corrugated sheet material composed of thin metal sheet folded continuously into a corrugated surface in strip form stacked in mutual contact, rolled about an axis into spiral forms to produce numerous air passages in reticulate pattern, said contacting portions being bonded by brazing filler metal, each said second honeycomb structure including axially spaced ends, one end of one of said second honeycomb structures positioned adjacent to one end of said first honeycomb structure and one end of the other second honeycomb structure positioned adjacent to the other end of said first honeycomb structure, and said second honeycomb structures being bonded to the casing within the casing.

2. A metal carrier for a catalytic converter according to claim 1 further comprising a gap in the axial direction between at least one end of the first honeycomb structure and said one end of one of the second honeycomb structures.

3. A metal carrier for a catalytic converter according to claim 1 or claim 2 wherein the concentration of air passages in said first honeycomb structure is greater than the concentration of air passages in said second honeycomb structures.

4. A metal carrier for a catalytic converter according to claim 3 further comprising a catalyst carrying layer including at least one catalyst on the surface of the air passages in the second honeycomb structures.

5. A metal carrier for a catalytic converter according to claim 4 wherein said at least one catalyst comprises at least two catalysts selected from the group consisting of a nitrogen oxides reduction catalyst, an oxidation catalyst, and a reduction catalyst for the respective catalyst-carrying layer on the surface of the air passages in each first and second honeycomb structures.

* * * * *